United States Patent
Aoki

(10) Patent No.: US 10,088,882 B2
(45) Date of Patent: Oct. 2, 2018

(54) ELECTRONIC CONTROL UNIT HAVING MULTIPLE POWER SUPPLY ROUTES FOR MICROCOMPUTER CORE

(71) Applicant: DENSO CORPORATION, Kariya, Aichi-pref. (JP)

(72) Inventor: Mitsuru Aoki, Kariya (JP)

(73) Assignee: DENSO CORPORATION, Kariya (JP)

( * ) Notice: Subject to any disclaimer, the term of this patent is extended or adjusted under 35 U.S.C. 154(b) by 110 days.

(21) Appl. No.: 15/071,253

(22) Filed: Mar. 16, 2016

(65) Prior Publication Data

US 2016/0357237 A1   Dec. 8, 2016

(30) Foreign Application Priority Data

Jun. 2, 2015   (JP) .................. 2015-112590

(51) Int. Cl.
*G06F 1/26*   (2006.01)

(52) U.S. Cl.
CPC ..................... *G06F 1/26* (2013.01)

(58) Field of Classification Search
CPC ..................... G06F 1/26; G06F 1/24
See application file for complete search history.

(56) References Cited

U.S. PATENT DOCUMENTS

| 5,877,928 A | 3/1999 | Makino |
| 2005/0127756 A1* | 6/2005 | Shepard .................. H02J 1/08 307/18 |
| 2006/0253718 A1* | 11/2006 | Kawase ............... G06F 1/3203 713/300 |
| 2009/0183018 A1 | 7/2009 | Nakamura et al. |
| 2013/0200698 A1 | 8/2013 | Kuno |

FOREIGN PATENT DOCUMENTS

JP   2006-293492 A   10/2006

* cited by examiner

*Primary Examiner* — Nitin C Patel
*Assistant Examiner* — Joshua Neveln
(74) *Attorney, Agent, or Firm* — Posz Law Group, PLC

(57) ABSTRACT

An electronic control unit includes a microcomputer, a power supply IC and a peripheral circuit part. The microcomputer includes a core operable with a first power supply voltage and an input/output circuit operable with a second power supply voltage higher than the first power supply voltage. The power supply IC generates the first power supply voltage and the second power supply voltage. The peripheral circuit part has a first input terminal for the first power supply voltage, a second input terminal for the second power supply voltage, and an internal circuit operable with a potential between the first power supply voltage and the second power supply voltage. A core input terminal for the first power supply voltage, a first output terminal for the first power supply voltage in the power supply IC and the first input terminal are electrically connected one another.

8 Claims, 4 Drawing Sheets

ELECTRONIC CONTROL UNIT HAVING MULTIPLE POWER SUPPLY ROUTES FOR MICROCOMPUTER CORE

CROSS REFERENCE TO RELATED APPLICATION

This application is based on Japanese patent application No. 2015-112590 filed on Jun. 2, 2015.

TECHNICAL FIELD

The present disclosure relates to an electronic control unit having a microcomputer, in which a core and an input/output circuit are provided and the core is operable with an operating voltage lower than that of the input/output circuit, a power supply circuit, which supplies operating voltages to the core and the input/output circuit by stepping down an external power supply voltage supplied from an external side, and a peripheral circuit part.

BACKGROUND ART

A conventional electronic control unit controls a control target by a microcomputer, which executes a variety of functions. In an electronic control unit used for controlling an automotive vehicle, for example, a core is configured to be operable with a voltage lower than that of an input/output circuit so that a microcomputer operates at high speeds to meet high functionality.

JP 2006-293492 A, for example, discloses an electronic control unit having a microcomputer, in which a core and an input/output circuit are provided and the core is operable with an operating voltage lower than that of the input/output circuit, a power supply circuit, which supplies operating voltages to the core and the input/output circuit by stepping down an external power supply voltage supplied from an external side, and a peripheral circuit part.

To meet high functionality of the microcomputer, an operating frequency of a digital circuit such as the core is increased and a circuit size of the digital circuit is increased. Thus the microcomputer consumes more current. With increased current consumption, the electronic control unit consumes more power and generates more heat. The core of the microcomputer consumes more current, which is supplied from a power supply circuit part, than other circuits.

SUMMARY

It is therefore an object to reduce heat generation in an electronic control unit including a microcomputer, in which an operating voltage of a core is lower than that of an input/output circuit.

According to one aspect, an electronic control unit comprises a microcomputer, a power supply circuit and a peripheral circuit part. The microcomputer includes a core, which operates with a first power supply voltage, and an input/output circuit, which operates with a second power supply voltage higher than the first power supply voltage. The power supply circuit part generates and outputs the first power supply voltage and the second power supply voltage by stepping down an external power supply voltage supplied from an external side. The peripheral circuit part is supplied with a high voltage, which is higher than the first power supply voltage.

The microcomputer has a core input terminal, to which the first power supply voltage is inputted. The power supply circuit part has an output terminal to output the first power supply voltage. The peripheral circuit part has a first input terminal, to which the first power supply voltage is inputted, a second input terminal, to which the high voltage is inputted, and an internal circuit, which is connected to the first power supply terminal and the second power supply terminal and operable with a potential between the first power supply voltage and the high voltage. The core input terminal, the output terminal and the first input terminal are connected electrically one another.

DETAILED DESCRIPTION OF EMBODIMENT

Figure 1:
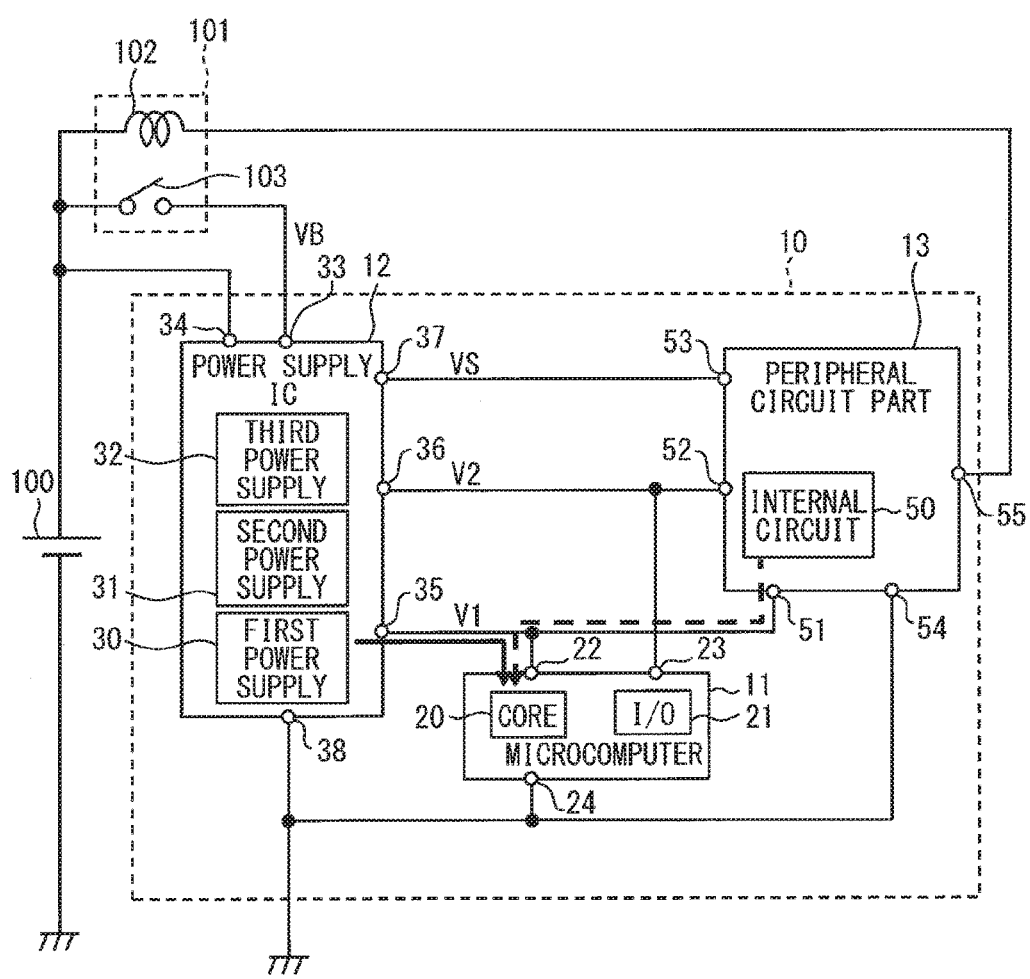
FIG. 1 is a block diagram showing overall configuration of an electronic control unit according to a first embodiment.

An electronic control unit will be described with reference to several embodiments shown in the drawings. In each embodiment, common or related parts are designated with the same reference numerals for brevity.

First Embodiment

Overall configuration of an electronic control unit according to a first embodiment will be described with reference to FIG. 1. In the first embodiment, an electronic control unit 10 is configured as an electronic control unit for an engine (engine ECU).

The electronic control unit 10 is located in an engine compartment of a vehicle (not shown). The electronic control unit 10 includes a microcomputer 11, a power supply integrated circuit (IC) 12 and a peripheral circuit part 13. The power supply IC 12 is provided as a power supply circuit part.

The microcomputer 11 is configured to execute a variety of functions for controlling an engine. The microcomputer 11 includes a core 20 and an input/output circuit 21. The core 20 is formed of a CPU, a ROM, a RAM, registers and the like and operable with a first power supply voltage V1. In the microcomputer 11, the CPU executes signal processing based on control programs pre-stored in the ROM and various data retrieved through a bus while using temporary storage functions of the RAM and the registers. The CPU further outputs signals produced in the signal processing to the bus. The microcomputer 11 thus executes the variety of functions described above. The microcomputer 11 calculates a target torque, which the engine is required to generate. The microcomputer 11 controls a throttle valve (not shown) to an appropriate opening position and controls fuel injection quantity and ignition time of the engine. The first power supply voltage V1 is set to a voltage, for example, 1.25V, which is lower than a second voltage V2 described later.

The input/output circuit 21 is a part of the microcomputer 11 for executing peripheral functions. The input/output circuit 21 is provided as a peripheral function circuit. The input/output circuit 21 functions to connect the microcomputer 11 and input/output circuits provided externally. The peripheral functions include an I/O port function, a serial communication function, a timer function, an A/D conversion function and the like. The input/output circuit 2115 operable with the second power supply voltage V2. The second power supply voltage V2 is set to a voltage, for example, 5V, which is higher than the first power supply voltage V1.

The microcomputer 11 has a core input terminal 22, an I/O terminal 23 and a ground terminal 24, as external connection terminals. The first power supply voltage V1 is supplied from the power supply IC 12 to the core input terminal 22. Thus the first power supply voltage V1 is supplied to the core 20 through the core input terminal 22. The second power supply voltage V2 is supplied from the power supply IC 12 to the I/O terminal 23. Thus the power supply voltage V2 is supplied to the input/output circuit 21 through the I/O terminal 23. The ground terminal 24 is a terminal connecting (grounding) to ground potential.

The power supply IC 12 includes a first power supply circuit 30 for generating and outputting the first power supply voltage V1, a second power supply circuit 31 for generating and outputting the second power supply voltage V2 and a third power supply circuit 32 for generating and outputting a power supply voltage VS. The power supply IC 12 includes a VB terminal 33, a battery (BATT) terminal 34, a first output terminal 35, a second output terminal 36, a third output terminal 37 and a ground terminal 38, as external connection terminals. The first output terminal 35 is one of output terminals of the power supply IC 12. The ground terminal 38 is a terminal for connection to the ground potential.

A voltage of a positive terminal of a battery 100 of a vehicle is supplied to the first power supply circuit 30 and the second power supply circuit 31 through a power supply relay 101, when an ignition switch (not shown) is turned on and an ON signal is outputted from a power supply relay control circuit to a switch of a power supply relay driving circuit (not shown). The power supply relay 101 is a main relay (MR) for the electronic control unit 10. In the following description, the voltage of the positive terminal of the battery 100 is referred to as a battery voltage. The battery voltage is referred to as an external power supply voltage.

Specifically, the VB terminal 33 is connected to one terminal of a movable contact 103 of the power supply relay 101, which is formed of a coil 102 and the movable contact 103. The other end of the movable contact 103 is connected to the positive terminal of the battery 100. The switch described above is included in the peripheral circuit part 13 and connected to a ground terminal 54 and a MR terminal 55 described later. When the switch is turned on, current flows to the coil 102 through the switch to close the movable contact 103. That is, the power supply relay 101 is turned on. Thus the battery voltage is supplied to the VB terminal 33 and supplied to the first power supply circuit 30 and the second power supply circuit 31 from the VB terminal 33.

The first power supply circuit 30 generates the first power supply voltage V1 and outputs to each part of the electronic control unit 10 through the first output terminal 35. The first power supply voltage V1 is also outputted to the peripheral circuit part 13, for example, in addition to the core 20 of the microcomputer 11. The first power supply circuit 30 may generate the first power supply voltage V1 by stepping down the battery voltage VB supplied through the power supply relay 101 or generate the first power supply voltage V1 by stepping down the second power supply voltage V2 outputted from the second power supply circuit 31.

The second power supply circuit 31 generates the second power supply voltage V2 by stepping down the battery voltage VB supplied through the power supply relay 101 and outputs it to each part of the electronic control unit 10 through the second output terminal 36. The second power supply voltage V2 is also outputted to the peripheral circuit part 13, for example, in addition to the input/output circuit 21 of the microcomputer 11.

When the first power supply circuit 30 and the second power supply circuit 31 starts outputting the first power supply voltage V1 and the second power supply voltage V2, respectively, the power supply IC 12 outputs a reset signal to the microcomputer 11 until the first power supply voltage V1 and the second power supply voltage V2 stabilize. The power supply IC 12 thus has a power-on reset function as well. For this reason, the microcomputer 11 starts its operation from its initial state when the first power supply circuit 30 and the second power supply circuit 31 start outputting the first power supply voltage V1 and the second power supply voltage V2, respectively.

The battery voltage is supplied continuously to the third power supply circuit 32 through the BATT terminal 34. The third power supply circuit 32 continues to generate the power supply voltage VS by stepping down the battery voltage and outputs it to each part of the electronic control unit 10 through the third output terminal 37. The power supply voltage VS is outputted to the peripheral circuit part 13, for example. The power supply voltage VS is also outputted to a power supply relay control circuit (not shown). In the first embodiment, the power supply voltage VS is set to be 5V, which is same as the second power supply voltage V2.

In the electronic control unit 10, the peripheral circuit part 13 is other than the microcomputer 11 and the power supply IC 12. The peripheral circuit part 13 includes input circuits for receiving various data such as sensor signals from external sides, output circuits such as driving circuits for driving external electric loads and the like circuits in addition to the power supply relay driving circuit, which includes the switch described above. The peripheral circuit part 13 includes an internal circuit 50. The peripheral circuit part 13 has a first input terminal 51, a second input terminal 52, a third input terminal 53, the ground terminal 54 and the MR terminal 55 as external connection terminals.

The internal circuit 50 operates with a potential, which is between the first power supply voltage V1 and the second power supply voltage V2. For example, the internal circuit 50 is configured as an input circuit, which converts signals inputted from an external ECU to corresponding voltage signals suitable for the microcomputer 11 and outputs the voltage signals.

The first power supply voltage V1 is inputted from the power supply IC 12 to the first input terminal 51. The first input terminal 51 is connected electrically to the first output terminal 35 and the core input terminal 22. The second power supply voltage V2 is inputted from the power supply IC 12 to the second input terminal 52. The second input terminal 52 is connected electrically to the second output terminal 36. The internal circuit 50 is connected to the first input terminal 51 and the second input terminal 52 and operates with a potential, which is between the first power supply voltage V1 and the second power supply voltage V2. In the first embodiment, the second power supply voltage V2 inputted to the second input terminal 52 is a high voltage.

The power supply voltage VS is inputted from the power supply IC 12 to the third input terminal 53. The third input terminal 53 is connected electrically to the third output terminal 37. The ground terminal 54 is a terminal for connection to the ground. The MR terminal 55 is connected to an end part of the power supply relay 101, which is opposite to one terminal connected to a positive terminal of the coil 102.

The electronic control unit 10 according to the first embodiment has the following advantages.

The peripheral circuit part 13 has the first input terminal 51 as the external connection terminal, to which the first power supply voltage V1 is inputted from the power supply IC 12. The first output terminal 35 of the power supply IC 12 for outputting the first power supply voltage V1, the core input terminal 22, to which the first power supply voltage V1 is inputted, and the first input terminal 51, to which the first power supply voltage V1 is inputted, are connected electrically one another. The peripheral circuit part 13 is connected to the first input terminal 51 and the second input terminal 52, to which the second power supply voltage V2 are inputted, and includes the internal circuit 50, which operates with the potential, which is between the first power supply voltage V1 and the second power supply voltage V2.

For this reason, when the second power supply voltage V2 is supplied to the internal circuit 50 through the second input terminal 52, the current flows to the core 20 through the internal circuit 50, the first input terminal 51 and the core input terminal 22 as shown by a broken-line arrow. Thus the current is also supplied to the core 20 from the peripheral circuit part 13 side. In the conventional configuration, in which a current is supplied to a core from only a power supply IC, a current is exhausted to the ground from an internal circuit of a peripheral circuit part through a ground terminal of the peripheral circuit part. As a result, in the first embodiment, the current supplied from the power supply IC 12 to the core 20 can be decreased in comparison to the conventional configuration. Thus total power consumption of the electronic control unit 10 can be decreased and hence heat generation can be decreased. In FIG. 1, the current supplied from the power supply IC 12 to the core 20 is indicated with a solid line arrow and the current supplied from the peripheral circuit 13 to the core 20 is indicated with the broken-line arrow.

The internal circuit 50 is not limited to a configuration, which is connected to the first input terminal 51 and the second input terminal 52. The internal circuit 50 may be configured to be connected to the first input terminal 51, to which the first power supply voltage V1 is inputted, and a terminal, to which a high voltage higher than the first power supply voltage V1, and operable with a potential between the first power supply voltage V1 and the high voltage.

For example, the internal circuit 50 may be connected to the third input terminal 53 in place of the second input terminal 52 and operate with a potential between the first power voltage V1 and the power supply voltage VS. In this configuration, the third input terminal 53 operates as a second input terminal and the power supply voltage VS is the high voltage.

Further, the internal circuit 50 may be connected to the MR terminal 55 in place of the second input terminal 52. This internal circuit 50 is described in a third embodiment. In this configuration, the MR terminal 55 operates as the second input terminal and the voltage inputted to the MR terminal 55 is the high voltage. The voltage inputted to the MR terminal 55 when the power supply relay 101 is in the on-state equals a sum voltage of the voltage of the first input terminal 51 and a voltage of a switch (internal circuit 50), which forms the power supply relay driving circuit.

Second Embodiment

The electronic control unit 10 according to a second embodiment is similar to the first embodiment. For this reason, the same parts as those of the electronic control unit 10 described as the first embodiment will not be described.

Figure 2:
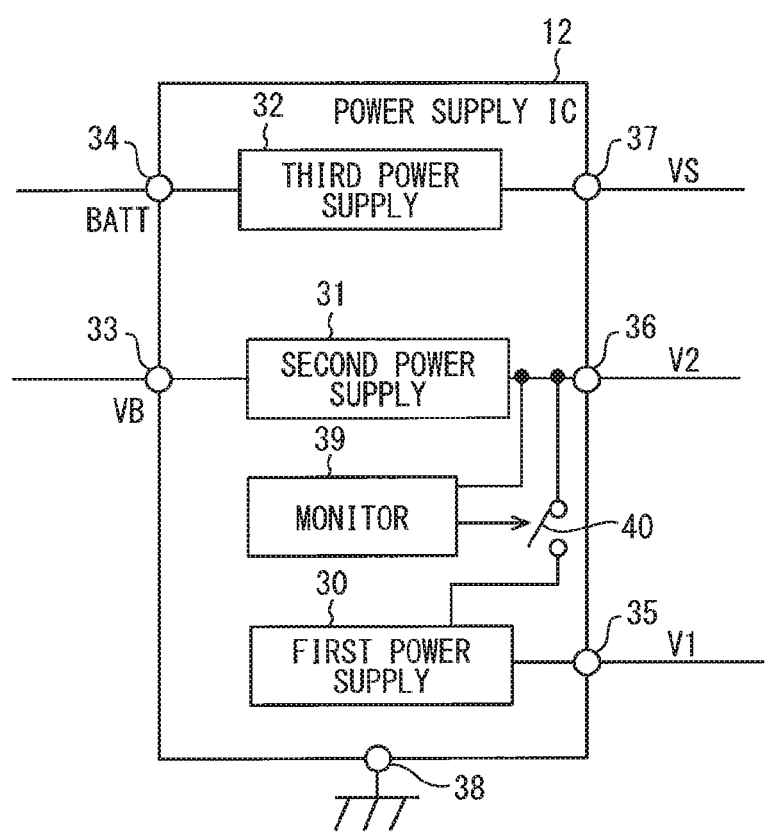
FIG. 2 is a block diagram showing an overall configuration of a power supply IC in an electronic control unit according to a second embodiment.
Figure 3:
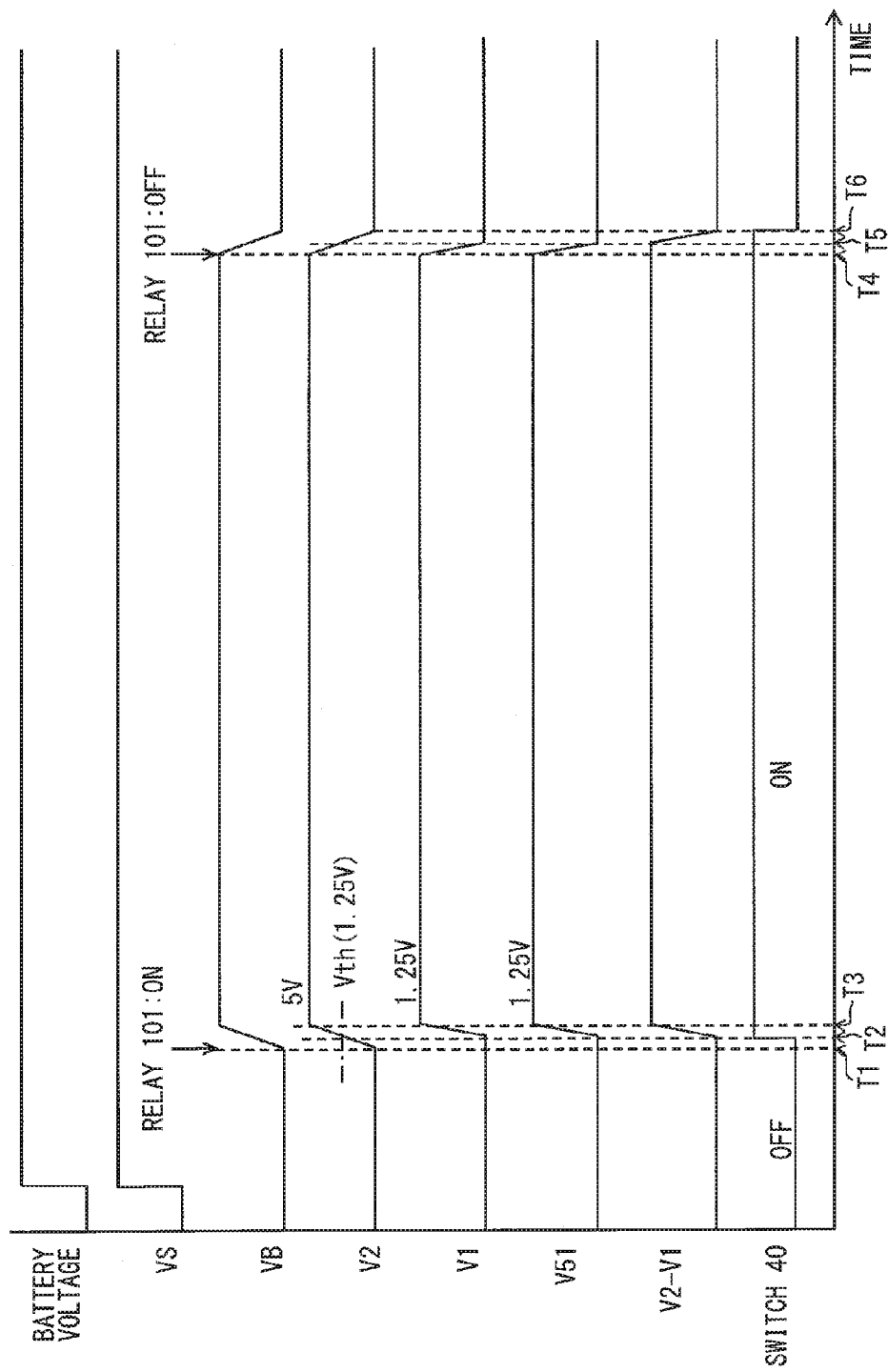
FIG. 3 is a time chart showing processing time of the power supply circuit.

The electronic control unit 10 according to the second embodiment has the power supply IC 12, which is different from the first embodiment as shown in FIG. 2 and FIG. 3. In FIG. 3, VB indicates the voltage at the VB terminal 33, V51 indicates a voltage at the first input terminal 51 of the peripheral circuit part 13, and V2−V1 indicates a potential difference between the second power supply voltage V2 and the first power supply voltage V1.

As shown in FIG. 2, the power supply IC 12 further includes a monitor circuit 39 and a switch 40. In the second embodiment, the first power supply circuit 30 is configured to generate and output the first power supply voltage V1 by stepping down the second power supply voltage V2. For this reason, the monitor circuit 39 monitors the second power supply voltage V2. The switch 40 is provided in a power supply line of the second power supply voltage V2 to the first power supply circuit 30. When the switch 40 is turned on, the second power supply voltage V2 is supplied to the first power supply circuit 30. When the switch 40 is turned off, the second power supply voltage V2 is not supplied to the first power supply circuit 30.

The monitor circuit 39 detects the second power supply voltage V2 outputted from the second power supply circuit 31. The monitor circuit 39 compares the detected second power supply voltage V2 with a threshold voltage Vth, which is predetermined and stored in a memory and outputs a signal indicating a comparison result to the switch 40. The monitor circuit 39 thus monitors the second power supply voltage V2 by detecting the second power supply voltage V2 and comparing the detected second power supply voltage V2 with the threshold voltage Vth. The threshold voltage Vth is set to a predetermined voltage, which the second power supply voltage V2 attains in the middle of rising. In the second embodiment, it is set to 1.25V, which is the same as the first power supply voltage V1.

When the second power supply voltage V2 outputted from the second power supply circuit 31 reaches the threshold voltage Vth, the monitor circuit 39 outputs an ON signal to the switch 40. When the second power supply voltage V2 becomes zero volt (0V), the monitor circuit 39 outputs an OFF signal to the switch 40. For this reason, as shown in FIG. 3, the switch 40 remains in an off-state until the power supply relay 101 is turned on at time T1. When the power supply relay 101 is turned on at time T1 and the battery voltage is supplied to the VB terminal 33, the second power supply circuit 31 responsively starts to generate the second power supply voltage V2. That is, the second power supply circuit 31 starts to raise the power supply voltage V2. In a period from time T1 of starting raising of the power supply voltage V2 to time T2 of rising of the power supply voltage V2 to the threshold voltage Vth, the second power supply voltage V2 is lower than the threshold voltage Vth and hence the switch 40 remains in the off-state. For this reason, the first power supply circuit 30 does not start generating the first power supply voltage V1.

When the second power supply voltage V2 reaches the threshold voltage Vth at time t2, the switch 40 is turned on. Thus the second power supply voltage V2 is supplied to the first power supply circuit 30 and the first power supply circuit 30 starts generating the first power supply voltage V1. The voltage at the first input terminal 51 rises correspondingly. When the second power supply voltage V2 rises to 5V at time T3, a voltage raising operation is finished. In the second embodiment, a voltage raising operation of the first power supply voltage V1 is also finished at the same time T3. However, the voltage raising operations of the first power supply voltage V1 and the second power supply voltage V2 may be finished at different time.

When the power supply relay 101 is turned off at time T4, the VB voltage at the VB terminal 33 gradually falls from time T4. The second power supply voltage V2 also falls correspondingly. Since the switch 40 remains in the on-state, the first power supply voltage V1 also falls as the second power supply voltage V2 falls. The first power supply voltage V1 falls to 0V at time T5. The second power supply voltage V2 also falls to 0V after a predetermined time elapse or delay. At time T6, the monitor circuit 39 outputs the OFF signal to the switch 40 to turn off the switch 40.

According to configuration described above, as shown in FIG. 3, the potential difference V2–V1 between the second power supply voltage V2 and the first power supply voltage V1 is continuously maintained to be equal to or larger than 0V. Particularly, even at ON time and OFF time of the power supply relay 101, the potential difference is continuously maintained to be equal to or larger than 0V. Since the first power supply voltage V1 does not exceed the second power supply voltage V2, no current flows from the first input terminal 51 towards the second input terminal 52. It is thus possible to suppress sneaking of current and protect the internal circuit 50.

Configuration of the power supply IC 12 for preventing the sneaking of current is not limited to the example described above. The power supply IC 12 may be configured to acquire the result of monitoring of the high voltage supplied to the internal circuit 50 and control the first power supply voltage V1 based on the monitor result so that no current flows from the first input terminal 51 towards the input terminal, to which the high voltage is supplied.

Although the monitor circuit 39 is exemplarily provided inside the power supply IC 12, it may be provided outside the power supply IC 12 in the electronic control unit 10. In a case that the high voltage is supplied from an outside of the electronic control unit 10, monitor information may be acquired from a monitor circuit provided outside the electronic control unit 10. Although the first power supply circuit 30 is exemplified to generate the first power supply voltage V1 by stepping down the second power supply voltage V2, the power supply circuit 30 may be configured to generate the first power supply voltage by stepping down the battery voltage.

Third Embodiment

The electronic control unit 10 according to a third embodiment is similar to the first embodiment. For this reason, the same parts as those of the electronic control unit 10 described as the first embodiment will not be described.

Figure 4:
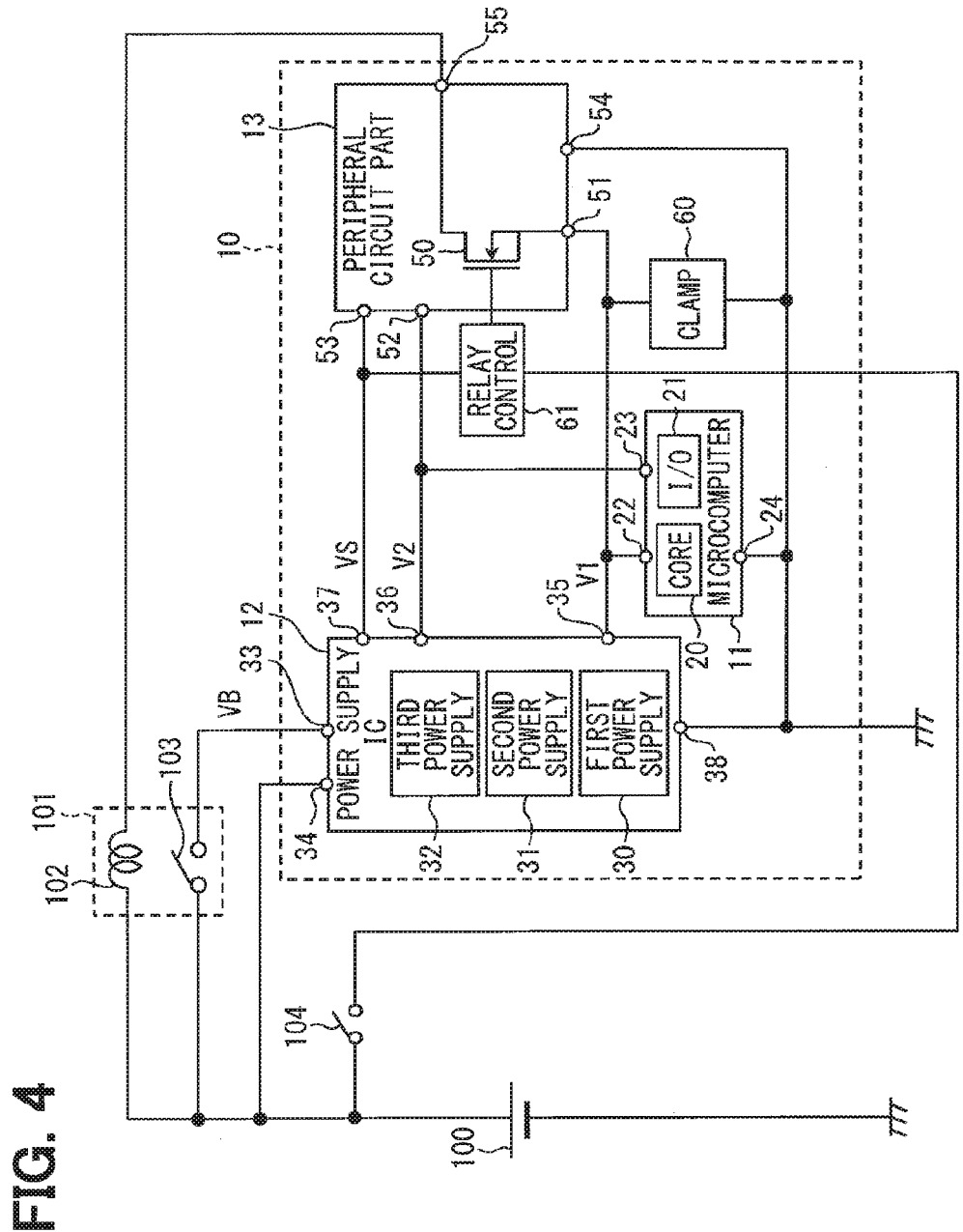
FIG. 4 is a block diagram showing an overall configuration of an electronic control unit according to a third embodiment.

As shown in FIG. 4, the electronic control unit 10 according to the fourth embodiment further includes a clamp circuit 60 in addition to the structural parts exemplified in the first embodiment.

In FIG. 4, The switch forming the power supply relay driving circuit is provided as the internal circuit 50. This internal circuit 50 is connected to the first input terminal 51 and the MR terminal 55. The switch forming the internal circuit 50 is an N-channel MOSFET with its source being connected to the first input terminal 51 and its drain being connected to the MR terminal 55.

When a driver of a vehicle turns on an ignition switch (IGSW) 104, an ON signal indicating turn-on of the IGSW 104 is inputted to a power supply relay control circuit 61. The power supply relay control circuit 61 is operable with the power supply voltage VS. For this reason, when the ON signal of the IGSW 104 is inputted, the power supply relay control circuit 61 outputs a driving signal to a gate of the switch forming the internal circuit 50 to turn on the switch. Thus the switch turns on and allows a current to flow through the coil 102 and the internal circuit 50. As a result, as described above, the power supply relay 101 turns on and supplies the battery voltage VB to the power supply IC 12.

The clamp circuit 60 is located between the first input terminal 51 and the ground to limit the voltage at the first input terminal 51 to be equal to or lower than an absolute maximum rated voltage. In the third embodiment, the clamp circuit 60 may be formed of a Zener diode. A cathode of the Zener diode is connected electrically to the first input terminal 51 and an anode of the same is connected to the ground. When a reverse voltage exceeding the absolute maximum rated voltage (for example, 1.5V) of the core 20 is applied, the Zener diode limits the voltage at the first input terminal 51 to a predetermined voltage, which is equal to or lower than the absolute maximum rated voltage. In the third embodiment, the Zener diode maintains the voltage at the first input terminal 51 at the absolute maximum rated voltage of the core 20.

According to the configuration described above, during a period from when the switch forming the internal circuit 50 is turned on in response to the turn-on of the IGSW 104 to when the first power supply circuit 30 in the power supply IC 12 generates and outputs, the voltage at the first input terminal 51, that is, the voltage at the core input terminal 22, is maintained to be equal to the absolute maximum rated voltage of the core 20 by the clamp circuit 60. In this period, the current flowing in the switch (internal circuit 50) flows to the ground through the clamp circuit 60 and the current flowing to the core 20 is limited to be equal to or less than an absolute maximum rated current. As a result, the core 20 is protected until first power supply voltage V1 is outputted from the power supply IC 12.

When the first power supply voltage V1 is outputted from the power supply IC 12, on the other hand, the first power supply voltage V1 is inputted to the core input terminal 22 and the first input terminal 51. Since the first power supply voltage V1 is lower than the absolute maximum rated voltage of the core 20, no current flows to the ground through the clamp circuit 60. For this reason, as described in the first embodiment, the current is supplied to the core 20 through the internal circuit 50, the first input terminal 51 and the core input terminal 22. As described above, heat generation is thus suppressed.

The electronic control unit 10 is not limited to the embodiments described above but may be implemented with various modifications.

Although the electronic control unit 10 is exemplified as the engine ECU, it is not limited to such an ECU.

The electronic control unit 10 comprises at least the microcomputer 11, the power supply IC 12 and the peripheral circuit part 13. The microcomputer 11 includes the core 20, which operates with the first power supply voltage V1, and the input/output circuit 21, which operates with the second power supply voltage V2 (>V1). The power supply IC 12 generates and outputs the first power supply voltage V1 and the second power supply voltage V2 by stepping down the external power supply voltage supplied from the external side. The peripheral circuit part 13 is supplied with the high voltage, which is higher than the first power supply voltage V1. The peripheral circuit part 13 has the first input terminal 51, to which the first power supply voltage V1 is inputted, the input terminal (for example, second input terminal 52), to which the high voltage is inputted, and the internal circuit 50, which is connected to the terminals 51 and 52 and operates with the potential between the first power supply voltage V1 and the high voltage. In the microcomputer 11, it is only necessary to connect electrically the core input terminal 22, to which the first power supply voltage V1 is inputted in the microcomputer 11, the first output terminal 35, which outputs the first power supply voltage V1 in the power supply IC 12, and the first input terminal 51 of the peripheral circuit part 13 one another.

What is claimed is:

1. An electronic control unit comprising:
   a microcomputer including a core, which operates with a first power supply voltage, and an input/output circuit, which operates with a second power supply voltage higher than the first power supply voltage;
   a power supply circuit part, which generates and outputs the first power supply voltage and the second power supply voltage by stepping down an external power supply voltage supplied from an external side; and
   a peripheral circuit part, to which a high voltage, which is higher than the first power supply voltage is supplied, wherein:
   the microcomputer has a core input terminal, to which the first power supply voltage is inputted;
   the power supply circuit part has an output terminal to output the first power supply voltage;
   the peripheral circuit part has a first input terminal, to which the first power supply voltage is inputted, a second input terminal, to which the high voltage is inputted, and an internal circuit, which is connected to the first input terminal and the second input terminal and operable with a potential between the first power supply voltage and the high voltage; and
   the core input terminal, the output terminal, and the first input terminal are connected electrically to one another to supply currents to the core of the microcomputer from both the output terminal of the power supply part and the first input terminal of the peripheral circuit part through the core input terminal.

2. The electronic control unit according to claim 1, wherein:
   the power supply circuit part acquires a monitor result about the high voltage and controls the first power supply voltage based on the monitor result so that no current flows from the first input terminal towards the second input terminal.

3. The electronic control unit according to claim 1, further comprising:
   a clamp circuit located between the first input terminal and ground to limit a voltage at the first input terminal to be equal to or lower than an absolute maximum rated voltage.

4. The electronic control unit according to claim 1, wherein:
   the internal circuit, which operates at a voltage difference between the first power supply voltage and the second power supply voltage, is configured to convert signals inputted from an external ECU to corresponding voltage signals suitable for the microcomputer with the potential between the first supply voltage and the second supply voltage.

5. The electronic control unit according to claim 4, wherein:
   the peripheral circuit part, which operates at the second power supply voltage, is configured to receive sensor signals from external sides and drive external electric loads.

6. The electronic control unit according to claim 1, wherein:
   the microcomputer further has an I/O terminal, which the second power supply voltage is supplied from the second power supply terminal for operation of the input/output circuit.

7. The electronic control unit according to claim 6, wherein:
   the core of the microcomputer and the internal circuit of the peripheral circuit part form a series circuit between the second power supply terminal and a ground; and
   the input/output circuit of the microcomputer is connected in parallel to the series circuit between the second power supply terminal and the ground.

8. An electronic control unit comprising:
   a microcomputer including a core, which operates with a first power supply voltage, and an input/output circuit, which operates with a second power supply voltage higher than the first power supply voltage;
   a power supply circuit part, which generates and outputs the first power supply voltage and the second power supply voltage by stepping down an external power supply voltage supplied from an external side; and
   a peripheral circuit part, to which a high voltage, which is higher than the first power supply voltage is supplied, wherein:
   the microcomputer has a core input terminal, to which the first power supply voltage is inputted;
   the power supply circuit part has an output terminal to output the first power supply voltage;
   the peripheral circuit part has a first input terminal, to which the first power supply voltage is inputted, a second input terminal, to which the high voltage is inputted, and an internal circuit, which is connected to the first input terminal and the second input terminal and operable with a potential between the first power supply voltage and the high voltage;
   the core input terminal, the output terminal, and the first input terminal are connected electrically to one another;
   the power supply circuit part acquires a monitor result about the high voltage and controls the first power supply voltage based on the monitor result so that no current flows from the first input terminal towards the second input terminal;
   the power supply circuit part includes a first power supply circuit, which generates and outputs the first power supply voltage, and a second power supply circuit, which generates and outputs the second power supply voltage by stepping down the external power supply voltage;
   the first power supply circuit generates the first power supply voltage by stepping down the second power supply voltage outputted from the second power supply circuit;
   the second power supply voltage is supplied to the peripheral circuit part as the high voltage;

the external power supply voltage is supplied to the power supply circuit part when a power supply relay is turned on;

the power supply circuit part further includes a monitor circuit, which monitors the second power supply voltage, and a switch provided in a power supply line, which supplies the second power supply voltage to the first power supply circuit;

the monitor circuit turns off the switch during a period from when the second power supply voltage starts to rise until when the second power supply voltage attains a predetermined threshold voltage, which is set in a middle of rising of the second power supply voltage, in a period of rising of the second power supply voltage after the power supply relay is turned on; and the monitor circuit turns on the switch when the second power supply voltage attains the threshold voltage, and the monitor circuit turns on the switch in a period from when the power supply relay is turned on to when the second power supply voltage falls.

* * * * *